US012046432B2

(12) United States Patent
Huang et al.

(10) Patent No.: US 12,046,432 B2
(45) Date of Patent: Jul. 23, 2024

(54) VACUUM INTERRUPTER

(71) Applicant: SICHUAN UNIVERSITY, Chengdu (CN)

(72) Inventors: Xiaolong Huang, Chengdu (CN); Xueyan Bai, Chengdu (CN); Weiwei Chen, Chengdu (CN); Haiyi Zhu, Chengdu (CN); Tao Sun, Chengdu (CN); Yuezheng Wu, Chengdu (CN); Guo Hong, Chengdu (CN); Yuhang Xia, Chengdu (CN); Lihua Zhao, Sichuan (CN); Junwen Ren, Sichuan (CN); Wenjun Ning, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 97 days.

(21) Appl. No.: 17/812,842

(22) Filed: Jul. 15, 2022

(65) Prior Publication Data

US 2023/0027571 A1 Jan. 26, 2023

(30) Foreign Application Priority Data

Jul. 20, 2021 (CN) ......................... 202110818464.3

(51) Int. Cl.
*H01H 33/664* (2006.01)
*H01H 33/662* (2006.01)

(52) U.S. Cl.
CPC .... *H01H 33/664* (2013.01); *H01H 33/66207* (2013.01); *H01H 2033/66223* (2013.01)

(58) Field of Classification Search
CPC ........... H01H 33/664; H01H 33/66207; H01H 33/66261; H01H 33/182; H01H 2033/66223

(Continued)

(56) References Cited

U.S. PATENT DOCUMENTS 4,130,781 A * 12/1978 Dethlefsen .............. H01J 17/14 218/135
4,250,364 A * 2/1981 Kimblin ............. H01H 33/6641 218/141

(Continued)

FOREIGN PATENT DOCUMENTS

CN 2298598 Y * 11/1998 ............. H01H 33/66

OTHER PUBLICATIONS

Translation of CN2298598 Y (Original document published Nov. 25, 1998) (Year: 1998).*

*Primary Examiner* — William A Bolton

(57) ABSTRACT

A vacuum interrupter. The vacuum interrupter comprising at least one anode side contact blade, at least one cathode side contact blade, at least one anode side conducting rod, at least one a cathode side conducting rod, a shielding case and an outer magnet, wherein the shielding case covers the at least one anode side contact blade, the c at least one anode side contact blade, the at least one anode side conducting rod and at least one cathode side conducting rod; and the outer magnet covers the shielding case. According to the vacuum interrupter, the outer magnet is arranged to generate a fixed first longitudinal magnetic field in the interelectrode area of the at least one anode side contact blade and the at least one cathode side contact blade, contraction of arcs during current breaking can be alleviated, the arcs are in a diffusion state, and ablation of the contact in the arcing process is reduced, and breaking capacity of a vacuum circuit breaker is guaranteed.

9 Claims, 1 Drawing Sheet

(58) Field of Classification Search
USPC ........................................... 218/39, 141, 142
See application file for complete search history.

(56) References Cited

U.S. PATENT DOCUMENTS

| | | | | | |
|---|---|---|---|---|---|
| 5,828,176 | A * | 10/1998 | Goebel | H01J 17/44 | 313/157 |
| 5,929,411 | A * | 7/1999 | Schulman | H01H 33/66261 | 218/139 |
| 10,256,067 | B1 * | 4/2019 | Sommerer | H01J 17/00 | |
| 2022/0068574 | A1 * | 3/2022 | Stacom | H01H 33/12 | |

* cited by examiner

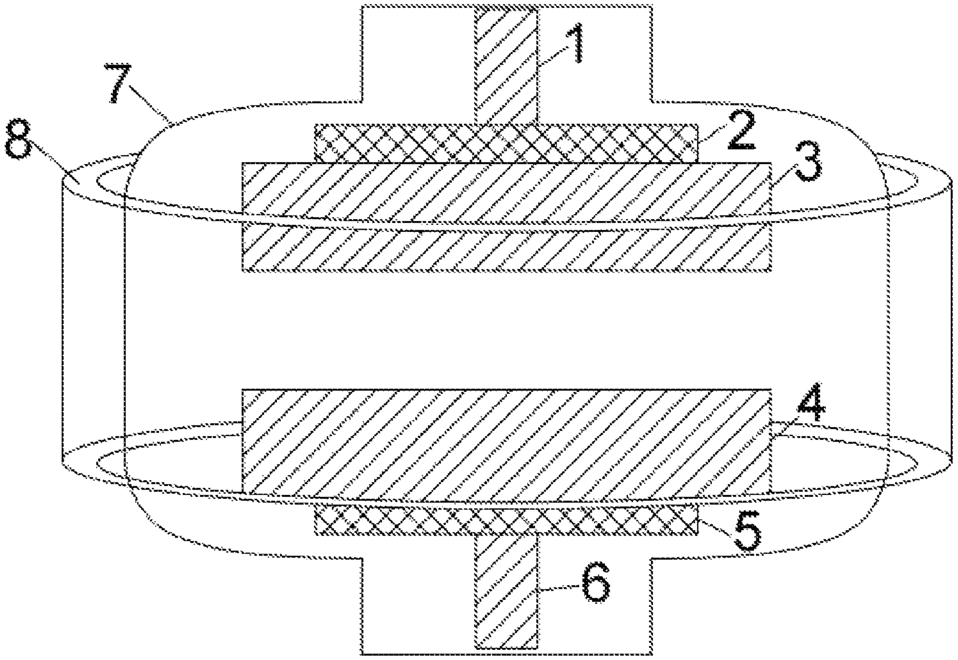
1
2
3
4
5
6
7
8

VACUUM INTERRUPTER

CROSS REFERENCE TO RELATED APPLICATION

This patent application claims the benefit and priority of Chinese Patent Application No. 202110818464.3, filed Jul. 20, 2021, the disclosure of which is incorporated by reference herein in its entirety as part of the present application.

FIELD

The present disclosure relates to the field of electrical equipment, in particular a vacuum interrupter.

BACKGROUND

The circuit breaker plays dual roles of protection and control in the electric power system, and the breaking performance of the circuit breaker is crucial. A vacuum interrupter is a core component of circuit breakers. The interrupter uses vacuum as insulating and an arc-quenching media to play a leading role in the medium-voltage field of power systems. Vacuum circuit breakers are being developed to handle high voltage and large current directions.

In the breaking process of the vacuum circuit breaker, a contact material is evaporated and ionized to form vacuum arc plasma, and vacuum arcs generate a contraction effect under the action of strong magnetic pinch force of a magnetic field, so that the surface of the contact is seriously ablated, and a great deal of metal vapor and particles are provided for arc column plasma to cause breaking failure. The contact system of an existing commercial vacuum interrupter usually adopts a longitudinal magnetic field control technology to control the vacuum arcs, and the vacuum arcs are still in a diffusion state under large current, so that the breaking capacity is improved.

However, existing longitudinal magnetic field contact systems have deficiencies: firstly, when a cup-shaped longitudinal magnetic contact system operates at rated current, contacts can be over heated as the structure is complex, the conductive area is relatively reduced, and no other heat dissipation mode exists in vacuum except two heat dissipation modes of heat conduction and radiation. Thus, the temperature of the whole vacuum interrupter is elevated, and the device cannot function with increased current. Secondly, contact structures are complex, the diameter of the contacts is large, and the size of the entire contact is large, so that the operating mechanism requires more operation power (the cathode is a moving electrode and is a moving contact during breaking) during breaking. Thus, the size and the cost of the operation is increased, and the quick breaking requirement is not easily met.

Although the longitudinal magnetic field can control the vacuum arcs and improve the breaking current of the vacuum circuit breaker, contacts for generating the longitudinal magnetic field are complex and generally reduce the rated working current of the vacuum circuit breaker and increase the burden on the operating mechanism. The above situations can be improved by removing the longitudinal magnetic field structure, but the breaking capacity will be reduced.

SUMMARY

The present disclosure provides an improved vacuum interrupter that enhances the breaking capacity of a vacuum circuit breaker and reduces the burden on the operating mechanism.

The new and improved vacuum interrupter follows the below general scheme.

A vacuum interrupter comprising:

an anode side contact blade;

a cathode side contact blade, one side of the cathode side contact blade and one side of the anode side contact blade being oppositely arranged;

an anode side conducting rod, being connected to the other side of the anode side contact blade;

a cathode side conducting rod, being connected to the other side of the cathode side contact blade;

a shielding case, the shielding case covering the peripheries of the anode side contact blade, the cathode side contact blade, the anode side conducting rod and the cathode side conducting rod sealing the anode side contact blade and the cathode side contact blade; and an outer magnet, the outer magnet covers the periphery of the shielding case such that a first longitudinal magnetic field in the interelectrode area of the anode side contact blade and the cathode side contact blade may be generated.

The vacuum interrupter of the invention may also further comprise:

at least one anode side magnet, wherein the anode side magnet covers the periphery of the anode side conducting rod and is located inside the shielding case and used for generating a second longitudinal magnetic field in the surface area of the anode side contact blade; the direction of said second longitudinal magnetic field being the same as that of the first longitudinal magnetic field.

In another embodiment of the invention, the vacuum interrupter further comprises:

at least one cathode side magnet, wherein the cathode side magnet covers the periphery of the cathode side conducting rod, is located inside the shielding case and can be used to generate a third longitudinal magnetic field in the surface area of the cathode side contact blade; the direction of said third longitudinal magnetic field is the same as that of the first longitudinal magnetic field.

In another embodiment, the cathode side contact blade, the anode side contact blade, the cathode side conducting rod and the anode side conducting rod are all located on the same axis.

In another embodiment, the outer magnet, the anode side magnet and the cathode side magnet are all permanent magnets.

In another embodiment, the outer magnet is in the shape of a circular column.

In another embodiment, the anode side magnet and the cathode side magnet are both in the shapes of circular columns.

In another variation of the invention, the anode side contact blade and the cathode side contact blade are both circular plate electrodes.

Preferably, the inner diameter of the outer magnet is greater than the diameter of the anode side contact blade; and the inner diameter of the outer magnet is greater than the diameter of the cathode side contact blade.

More preferably, the inner diameter of the outer magnet is greater than the outer diameter of the anode side magnet on the outermost layer; and the inner diameter of the outer magnet is greater than the outer diameter of the cathode side magnet on the outermost layer.

Accordingly, the present invention has significant technical advantages over the art.

The vacuum interrupter provided by the present disclosure comprises an anode side contact blade, a cathode side contact blade, an anode side conducting rod, a cathode side conducting rod, an outer magnet and a shielding case, wherein one side of the cathode side contact blade and one side of the anode side contact blade are oppositely arranged; the anode side conducting rod is connected with the other side of the anode side contact blade; the cathode side conducting rod is connected with the other side of the cathode side contact blade; the shielding case covers the peripheries of the anode side contact blade, the cathode side contact blade, the anode side conducting rod and the cathode side conducting rod; and the outer magnet covers the periphery of the shielding case. According to the invention, the outer magnet is arranged to generate a fixed first longitudinal magnetic field in the interelectrode area of the anode side contact blade and the cathode side contact blade, such that contraction of arcs during current breaking can be relieved, the resultant arcs are in a diffusion state and ablation of the contact in the arcing process is alleviated and the breaking capacity of a vacuum circuit breaker is guaranteed. As compared with cup-shaped longitudinal magnetic contact structures, the vacuum interrupter provided here has a simple structure, is light weight and smaller. This inventive vacuum interrupter effectively reduces the heat produced when the vacuum interrupter operates under rated current, alleviates the burden on an operating mechanism, and facilitates the improvement of the breaking capacity of the vacuum circuit breaker.

BRIEF DESCRIPTION OF THE DRAWINGS

To describe the technical scheme in the embodiments of the present disclosure or in the prior art more clearly, the following briefly introduces the attached FIGURES required for describing the embodiments. Apparently, the attached FIGURES in the following description show merely some embodiments of the present disclosure, and those skilled in the art may envision other embodiments that are disclosed herein.

FIG. 1 is a structural schematic diagram of a vacuum interrupter of this invention.

REFERENCE SIGNS

1, anode side conducting rod; 2, anode side magnet; 3, anode side contact blade; 4, cathode side contact blade; 5, cathode side magnet; 6, cathode side conducting rod; 7, shielding case; and 8, outer magnet.

DETAILED DESCRIPTION OF THE EMBODIMENTS

The following clearly and completely describes the technical scheme of the embodiments of the present invention with reference to FIG. 1. The described specific embodiments are merely illustrative of the present invention, and the patent disclosure should not be limited to those embodiments.

The present invention describes an improved vacuum interrupter to enhanced breaking capacity of a vacuum circuit breaker and reduce the burden on an operating mechanism.

The present disclosure is described in detail below with reference to the attached FIGURES and specific embodiments.

As shown in FIG. 1, the vacuum interrupter in the present disclosure comprises an anode side contact blade 3, a cathode side contact blade 4, an anode side conducting rod 1, a cathode side conducting rod 6, a shielding case 7 and an outer magnet 8.

Specifically, one side of the cathode side contact blade 4 and one side of the anode side contact blade 3 are oppositely arranged; the anode side conducting rod 1 is connected to the other side of the anode side contact blade 3; and the cathode side conducting rod 6 is connected with the other side of the cathode side contact blade 4.

The shielding case 7 covers the anode side contact blade 3, the cathode side contact blade 4, the anode side conducting rod 1 and the cathode side conducting rod 6. The shielding base 7 seals the anode side contact blade 3 and the cathode side contact blade 4 so as to prevent the anode side contact blade 3 and the cathode side contact blade 4 from generating a excess metallic vapor and subsequent decreases in the arcing process that may pollute an insulating shell of the vacuum interrupter and reduce the insulating strength of the shell of the vacuum interrupter or flashover. Moreover, the shielding case 7 may improve the electric field distribution inside the vacuum interrupter to absorb part of arc energy and condense arc products.

The outer magnet 8 covers the shielding case 7; and the outer magnet 8 is used to generate a first longitudinal magnetic field in the interelectrode area of the anode side contact blade 3 and the cathode side contact blade 4.

According to this invention, the outer magnet 8 is arranged to generate the first longitudinal magnetic field such that contraction of arcs in the interelectrode area of the anode side contact blade 4 and the cathode side contact blade 3 during current breaking can be relieved, the diffusion state of the vacuum arcs is maintained, and ablation of the contact in the arcing process is alleviated, and breaking larger currents is achieved.

Optionally, the cathode side contact blade 4, the anode side contact blade 3, the cathode side conducting rod 6 and the anode side conducting rod 1 are all located on the same axis. Namely, the cathode side contact blade 4 is coaxially opposite to the anode side contact blade 3, the cathode side conducting rod 6 is coaxially connected with the cathode side contact blade 3, and the anode side conducting rod 1 is coaxially connected with the anode side contact blade 3.

Further, the vacuum interrupter further comprises at least one anode side magnet 2. The at least one anode side magnet covers the periphery of the anode side conducting rod 1 and is located inside the shielding case 7 and used for generating a second longitudinal magnetic field in the surface area of the anode side contact blade 3; the direction of said second longitudinal magnetic field is the same as that of the first longitudinal magnetic field.

According to the present invention, the at least one anode side magnet 2 is arranged to generate a second longitudinal magnetic field, and the contraction of the arcs in the surface area of the anode side contact blade 3 during current breaking can be relieved. When the distance between the anode side contact blade 3 and the cathode side contact blade 4 is relatively large, a relatively stable longitudinal magnetic field remains in the surface area of the anode side contact blade 3, so that any accumulation phenomenon of the arcs on the anode side is relieved, and the erosion of the anode side contact blade 3 by the arcs is reduced.

Further, the claimed vacuum interrupter further comprises at least one cathode side magnet 5. The at least one cathode side magnet 5 covers the periphery of the cathode side conducting rod 6, and is located inside the shielding case 7 and used for generating a third longitudinal magnetic field in the surface area of the cathode side contact blade 4; the direction of said third longitudinal magnetic field is the same as that of the first longitudinal magnetic field.

According to the present invention, the at least one cathode side magnet 5 is arranged to generate a third longitudinal magnetic field, and the contraction of the arcs in the surface area of the cathode side contact blade 4 during current breaking can be relieved. When the distance between the anode side contact blade 3 and the cathode side contact blade 4 is relatively large, a relatively stable longitudinal magnetic field remains in the surface area of the cathode side contact blade 4, and accumulation phenomenon of the arcs on the cathode side is relieved, and erosion of the cathode side contact blade 4 by the arcs is reduced.

Moreover, the directions of the second longitudinal magnetic field and the third longitudinal magnetic field are both the same as the direction of the first longitudinal magnetic field generated by the outer magnet 8, and the longitudinal magnetic field in the interelectrode area of the anode side contact blade 3 and the cathode side contact blade 4 can be further enhanced, so that the diffusion state of the arcs in the interelectrode area is enhanced, and the breaking capacity of the vacuum circuit breaker is improved.

In an embodiment of the invention, the outer magnet 8, the anode side magnet 2 and the cathode side magnet 5 are all permanent magnets, and are made of permanent magnet materials such as aluminum-nickel-cobalt permanent magnet alloy, iron-chromium-cobalt permanent magnet alloy, permanent magnetic ferrite, a rear earth permanent magnetic field and a composite permanent magnetic material. The directions of the first longitudinal magnetic field, the second longitudinal magnetic field and the third longitudinal magnetic field are all the directions from the anode side contact blade 3 to the cathode side contact blade 4, but not limited to, and can be adjusted according to actual requirements.

Preferably, the anode side conducting rod 1 and the cathode side conducting rod 6 are both cylinders.

Preferably, the outer magnet 8 is in the shape of a circular column.

Preferably, the anode side magnet 2 and the cathode side magnet 5 are both in the shapes of circular columns.

As a specific implementation of the invention, the anode side contact blade 3 and the cathode side contact blade 4 are both plate electrodes, and the shapes of the anode side contact blade 3 and the cathode side contact blade 4 are both circular.

As compared to cup-shaped longitudinal magnetic contact structures, this disclosed vacuum interrupter adopts the plate electrodes, is a simple structure, with a large contact surface, with reduced heat production of the vacuum circuit breaker during operation under rated current, with reduced size compared with the cup-shaped longitudinal magnetic contact, and low requirements for the operating mechanism.

Further, the inner diameter of the outer magnet 8 is greater than the diameter of the anode side contact blade 3; and the inner diameter of the outer magnet 8 is greater than the diameter of the cathode side contact blade 4.

In the embodiment, the anode side contact blade 3 is used as a static contact, and the cathode side contact blade 4 is used as a moving contact. The inner diameter of the outer magnet 8 is greater than the diameter of the cathode side contact blade 4, so that the cathode side contact blade 4 can be reliably moved under the driving of the operating mechanism of the vacuum circuit breaker to realize a breaking function.

Correspondingly, if the anode side contact blade 3 is used as a moving contact and the cathode side contact blade 4 is used as a static contact, the anode side contact blade 3 can move under the driving of the operating mechanism of the vacuum circuit breaker to realize the breaking function.

Further, in some embodiments, the inner diameter of the outer magnet 8 may be greater than the outer diameter of the anode side magnet 2 on the outermost layer; and the inner diameter of the outer magnet 8 is greater than the outer diameter of the cathode side magnet 5 on the outermost layer.

As a specific implementation mode of the embodiment, when the number of the anode side magnets 2 is one, the inner diameter of the outer magnet 8 is greater than the outer diameter of the anode side magnet 2.

As a specific implementation mode of the embodiment, when the number of the anode side magnets 2 is multiple, the anode side magnets 2 are longitudinally arranged or transversely arranged in the mode that the outer diameters of the anode side magnets 2 are gradually increased, the anode side magnets 2 sequentially sleeve the periphery of the anode side conducting rod 1, and the inner diameter of the outer magnet 8 is greater than the outer diameter of any one of the anode side magnets 2.

As a specific implementation mode of the embodiment, when the number of the cathode side magnets 5 is one, the inner diameter of the outer magnet 8 is greater than the outer diameter of the cathode side magnet 5.

As a specific embodiment, when the number of the cathode side magnets 5 is multiple, the cathode side magnets 5 are longitudinally arranged or transversely arranged in the mode that the outer diameters of the cathode side magnets 5 are gradually increased, the cathode side magnets 2 sequentially covers the periphery of the cathode side conducting rod 6, and the inner diameter of the outer magnet 8 is greater than the outer diameter of any one of the cathode side magnets 2.

Compared with common plate electrode structures, the outer magnet 8 added to the claimed vacuum interrupter will generate relatively stable longitudinal magnetic fields in the interelectrode area. Due to the stability of the longitudinal magnetic field, the vacuum circuit breaker can keep the diffusion state of the vacuum arcs in the breaking process, so that the ablation of the contact in the arcing process is reduced. Therefore, breaking larger currents may be achieved, and the breaking capability of the vacuum circuit breaker is improved. The anode side magnet 2 covers the periphery of the anode side conducting rod 1. A stable longitudinal magnetic field exists in the surface area of the anode side contact blade 3 when the distance is large, the accumulation phenomenon of the arcs on the anode side are relieved, and the erosion of the anode side contact blade by the arcs is reduced. The cathode side magnet 5 covers the periphery of the cathode side conducting rod 6. A stable longitudinal magnetic field exists in the surface area of the cathode side contact blade 4 when the distance is large, the accumulation phenomenon of the arcs on the cathode side is relieved, and the erosion of the cathode side contact blade by the arcs is reduced.

Compared with cup-shaped longitudinal magnetic contact structures, the contact in the vacuum interrupter provided by the present invention is a plate electrode, and the vacuum interrupter has a simple structure and large in contact surface. By using plate electrodes, the heat productivity of the circuit breaker during rated current operation can be reduced, and longitudinal magnetic fields generated by the outer magnet 8, the anode side magnet 2 and the cathode side magnet 5 can still keep the diffusion state of the vacuum arcs such that large current breaking capacity is ensured, and the effect similar to that of the cup-shaped longitudinal magnetic contact is achieved. However, compared with cup-shaped longitudinal magnetic contacts, the structure is more concise, and the required operation work of the operating mechanism can be markedly reduced. A traditional cup-shaped longitudinal magnetic contact requires larger sizes in order to break higher-grade current, the contact structure design is more complex, and therefore the operation work needed by the operating mechanism during current breaking is greatly increased. According to the invention, the structure of the contact is improved, the size and the weight of the vacuum interrupter are reduced, the required operation work of the operating mechanism is reduced, the heat productivity of the vacuum circuit breaker during operation under rated current is further greatly reduced, and the breaking capacity of the vacuum circuit breaker is much improved.

All embodiments in this specification are described in a progressive manner. Each embodiment focuses on differences from other embodiments. For the part that is the same or similar between different embodiments, reference may be made between the embodiments.

The disclosed embodiments are illustrative of the principles and implementation methods of the present invention. The description of the embodiments is used to help illustrate the core principles of the present invention. In addition, those skilled in the art can make various modifications in terms of specific embodiments and scope of application in accordance with the teachings of the present disclosure. In conclusion, the content of this specification shall not be construed as a limitation to the present disclosure.

The invention claimed is:

1. A vacuum interrupter, comprising:

at least one anode side contact blade;

at least one cathode side contact blade, one side of the at least one cathode side contact blade and one side of the at least one anode side contact blade being oppositely arranged;

at least one anode side conducting rod, being connected with the other side of the at least one anode side contact blade;

at least one a cathode side conducting rod, being connected with the other side of the at least one cathode side contact blade;

a shielding case, the shielding case covering the at least one anode side contact blade, the at least one cathode side contact blade, the at least one anode side conducting rod and the at least one cathode side conducting rod and being used for sealing the at least one anode side contact blade and the at least one cathode side contact blade; and an outer magnet, the outer magnet covering the shielding case and being used for generating a first longitudinal magnetic field in an interelectrode area of the at least one anode side contact blade and the at least one cathode side contact blade;

the vacuum interrupter further comprising:

at least one anode side magnet, wherein the anode side magnet covers a periphery of the at least one anode side conducting rod, and is located inside the shielding case and used for generating a second longitudinal magnetic field in a surface area of the anode side contact blade; and a direction of the second longitudinal magnetic field is same as that of the first longitudinal magnetic field.

2. The vacuum interrupter according to claim 1, further comprising:

at least one cathode side magnet, wherein the cathode side magnet covers a periphery of the at least one cathode side conducting rod, and is located inside the shielding case and used for generating a third longitudinal magnetic field in a surface area of the at least one cathode side contact blade; and a direction of the third longitudinal magnetic field is same as that of the first longitudinal magnetic field.

3. The vacuum interrupter according to claim 2, wherein the outer magnet is in a shape of a circular column.

4. The vacuum interrupter according to claim 3, wherein the anode side magnet and the cathode side magnet are both in shapes of circular columns.

5. The vacuum interrupter according to claim 4, wherein the anode side contact blade and the cathode side contact blade are both circular plate electrodes.

6. The vacuum interrupter according to claim 5, wherein an inner diameter of the outer magnet is greater than a diameter of the anode side contact blade; and the inner diameter of the outer magnet is greater than a diameter of the cathode side contact blade.

7. The vacuum interrupter according to claim 4, wherein an inner diameter of the outer magnet is greater than an outer diameter of the anode side magnet on an outermost layer; and the inner diameter of the outer magnet is greater than an outer diameter of the cathode side magnet on the outermost layer.

8. The vacuum interrupter according to claim 1, wherein the at least one cathode side contact blade, the at least one anode side contact blade, the at least one cathode side conducting rod and the at least one anode side conducting rod are all located on a same axis.

9. The vacuum interrupter according to claim 1, wherein the outer magnet, the anode side magnet and the cathode side magnet are all permanent magnets.

* * * * *